US012794545B2

(12) United States Patent
Vivanco

(10) Patent No.: US 12,794,545 B2
(45) Date of Patent: Nov. 10, 2026

(54) METHODS, SYSTEMS, AND DEVICES FOR DETERMINING MEASUREMENT GAP LENGTH DURATION FOR UNMANNED AERIAL VEHICLES (UAVS) TO IDENTIFY NEIGHBORING BASE STATIONS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

(*) Notice: Subject to any disclaimer, the term of this patent is extended or adjusted under 35 U.S.C. 154(b) by 265 days.

(21) Appl. No.: 18/673,996

(22) Filed: May 24, 2024

(65) Prior Publication Data

US 2025/0365064 A1 Nov. 27, 2025

(51) Int. Cl.

| | |
|---|---|
| ***H04B 7/185*** | (2006.01) |
| ***G01S 5/14*** | (2006.01) |
| ***H04W 64/00*** | (2009.01) |

(52) U.S. Cl.

CPC ............ *H04B 7/18504* (2013.01); *G01S 5/14* (2013.01); *H04W 64/00* (2013.01)

(58) Field of Classification Search

CPC ....... H04B 7/18504; G01S 5/14; H04W 64/00

See application file for complete search history.

(56) References Cited

U.S. PATENT DOCUMENTS

| | | | |
|---|---|---|---|
| 2017/0295591 A1 | 10/2017 | Nguyen et al. | |
| 2018/0069618 A1 | 3/2018 | Loehr et al. | |
| 2018/0255499 A1 | 9/2018 | Loehr et al. | |
| 2019/0313454 A1 | 10/2019 | Pu et al. | |
| 2020/0107237 A1 | 4/2020 | Mangalvedhe et al. | |
| 2021/0400503 A1 | 12/2021 | Wang | |
| 2023/0069947 A1* | 3/2023 | Lee ....................... | H04L 1/0061 |
| 2024/0113773 A1 | 4/2024 | Phuyal et al. | |
| 2024/0196265 A1 | 6/2024 | Starsinic et al. | |
| 2024/0422621 A1 | 12/2024 | Rao et al. | |
| 2025/0261014 A1 | 8/2025 | Vivanco | |
| 2025/0261035 A1 | 8/2025 | Vivanco | |
| 2025/0350344 A1 | 11/2025 | Vivanco | |
| 2025/0350345 A1 | 11/2025 | Vivanco | |

OTHER PUBLICATIONS

"Non-Final Office Action for U.S. Appl. No. 18/659,196 dated Apr. 8, 2026", Apr. 8, 2026, 18 pages.

* cited by examiner

*Primary Examiner* — Curtis B Odom

(74) *Attorney, Agent, or Firm* — Guntin & Gust, PLC; Atanu Das

(57) ABSTRACT

Aspects of the subject disclosure may include, for example, identifying a first location of an unmanned aerial vehicle (UAV), determining a group of neighboring base stations based on the first location of the UAV utilizing a machine learning software application, identifying a carrier frequency associated with each of the group of neighboring base stations resulting in a group of carrier frequencies, and providing first instructions over a mobile network to the UAV. The first instructions indicate the group of carrier frequencies. Other embodiments are disclosed.

20 Claims, 9 Drawing Sheets

200

210

220

FIG. 2D
230
Identify 1st Location of UAV
230a
Determine Group of Neighboring BSs
230b
Identify Carrier Frequencies
230c
Provide 1st Instructions
230d
Determine LH in Detecting Each Carrier Frequency
230e
Determine 1st LH Parameters
230ee
Provide 1st LH Parameters
230f
Identify 1st Portion of 1st LH Parameters
230g
Determine 1st Portion of 1st LH Parameters > 1st Threshold
230h
Determine Latency Parameter
230i
Determine Scanning Timer
230j
Determine Measurement Gap Length
230k
Provide 2nd Instructions
230l
Implement Measurement Gap Length
230m
Determine LH in Detecting Carrier Frequency
230n
Determine 2nd LH Parameters
230o
Receive 2nd LH Parameters
230p
Identify 2nd Portion of 2nd LH Parameters
230q
Adjust Latency Parameter
230s
Determine 2nd Portion of 2nd LH Parameters > 2nd Threshold
230r

600

METHODS, SYSTEMS, AND DEVICES FOR DETERMINING MEASUREMENT GAP LENGTH DURATION FOR UNMANNED AERIAL VEHICLES (UAVS) TO IDENTIFY NEIGHBORING BASE STATIONS

FIELD OF THE DISCLOSURE

The subject disclosure relates to methods, systems, and devices for determining measurement gap length duration for unmanned aerial vehicles (UAVs) to identify neighboring base stations.

BACKGROUND

Aerial user equipment (UEs) (e.g., UAVs) can use location-based services (LBS) techniques to estimate their location in the absence of GPS. UAVs can detect many more neighboring base stations compared to terrestrial UEs (e.g., mobile phones), because a UAV is at higher altitude, and thereby can receive radio signals from many more neighboring base station than terrestrial UEs. UAVs may be able to detect system information blocks (SIB) for multiple frequency carries and technologies (e.g., LTE, 5G, etc.). During measurement gaps (e.g., in between data transmission) with large measurement gap length (MGL) durations, a UAV can detect several neighboring base stations, however, a UAV may have to disconnect from serving base station during those measurement gaps to detect the neighboring base stations. Further, a UAV may use over-the-air (OTA) connection to communicate with a ground control station for navigation instructions during data transmission. Measurement gaps can create additional delay in receiving critical ground station to UAV communications that include such navigation instructions.

During measurement gaps the UAV can disconnect from its serving base station to scan for carrier frequencies associated with neighboring base stations; in its own frequency band, in different frequency bands, in different technologies (e.g., LTE, 5G, etc.). A base station can provide the UAV instructions about the sequences of carrier frequency scanning in the measurement configuration, which is passed to the UAV during a RRC Connection procedure in which RRC Connection messages are exchanged. If the UAV detects a carrier frequency of a neighboring base station, the UAV can synchronize to it to obtain SIB information (including neighboring cell-ID information) and perform ranging measurements. This process can repeat for each carrier frequency of neighboring base station that the UAV finds in a given frequency band or technology (e.g., LTE, 5G, etc.) it scans.

For terrestrial UEs, the base station provides a list of base stations, each of which utilizes at different carrier frequency or technology to communicate with the UAV, scan during measurement gap. The base stations are usually neighboring base stations to the serving base station. For example, if an UAV is attached to base station/cell.1 @800 Mhz, and cell.1 has these neighboring cells: cell2 @810, cell3 @820, cell4 @850. Then, the base station will include this carrier frequency list to the UUAV in the measurement configuration, which is passed to the UAV during the RRC Connection procedure. Note, that UAV only needs to detect two neighboring base stations during the measurement gaps to perform triangulation (because the serving base station counts as one base station needed for triangulation)

It is likely that a UAV can detect larger number of neighboring base stations than a terrestrial UE. Also, it is likely that a UAV can detect far away base stations (due to its high altitude) easier than closer neighboring base stations. A UAV needs to detect at least two neighboring base stations to perform triangulation in a fast and efficient manner.

BRIEF DESCRIPTION OF THE DRAWINGS

Reference will now be made to the accompanying drawings, which are not necessarily drawn to scale, and wherein.

DETAILED DESCRIPTION

Figure 1:
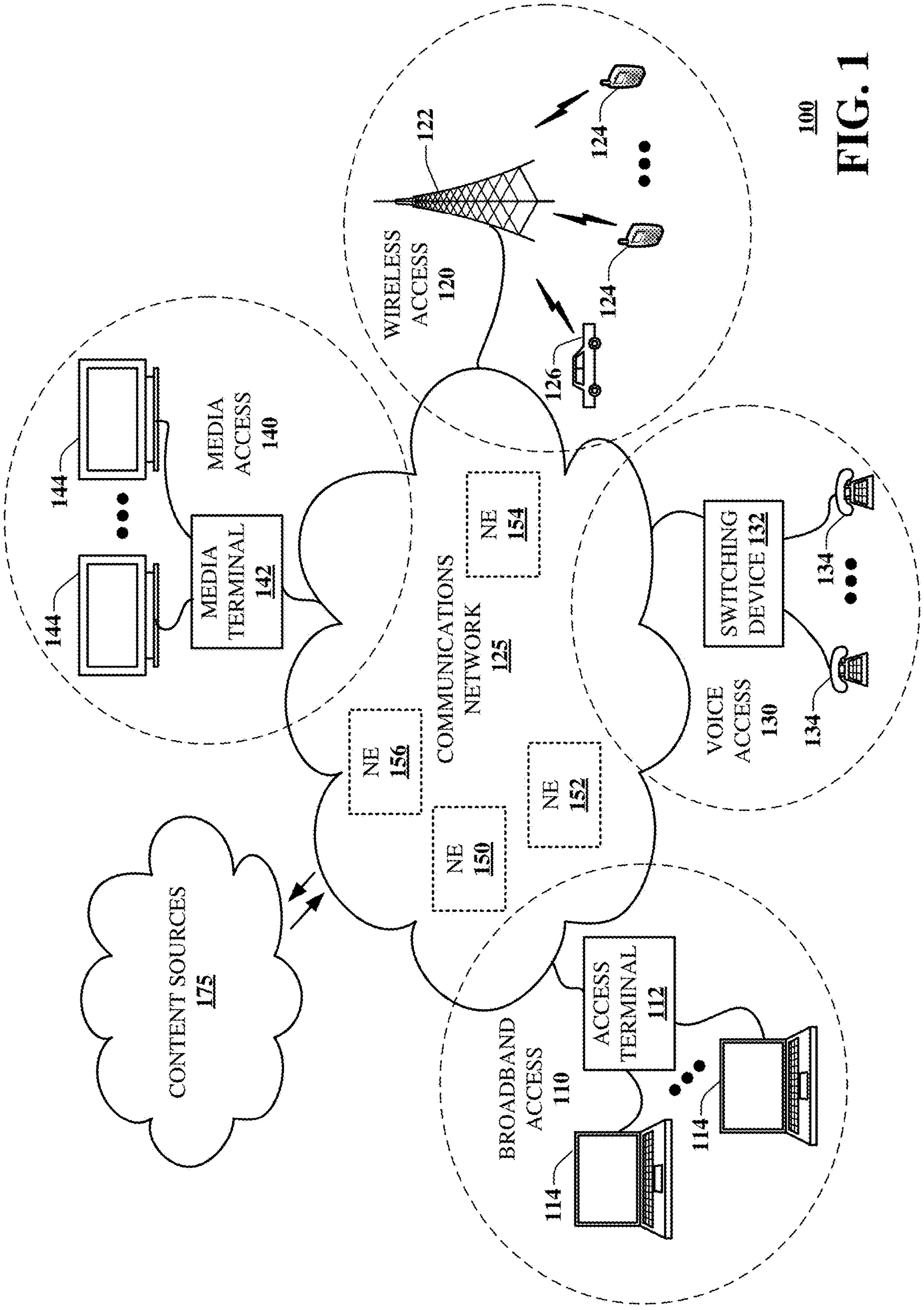
FIG. 1 is a block diagram illustrating an exemplary, non-limiting embodiment of a communications network in accordance with various aspects described herein.

In one or more embodiments, a UAV can determine a likelihood parameter for each neighboring base station resulting in a first group of likelihood parameters in response to the likelihood in detecting a carrier frequency associated with each neighboring base station. Further, the UAV can provide the first group of likelihood parameters to its serving base station. In addition, the serving base station can determine a latency parameter based on the first group of likelihood parameters and determine a measurement gap length duration based on the latency parameter. Also, the serving base station can provide the measurement gap length duration to the UAV. Subsequently, the UAV determine a likelihood parameter for each neighboring base station during the measurement gap length resulting in a second group of likelihood parameters in response to the likelihood in detecting a carrier frequency associated with each neighboring base station. Further, the UAV can provide the second group of likelihood parameters to its serving base station.

The subject disclosure describes, among other things, illustrative embodiments for identifying a first location of an unmanned aerial vehicle (UAV), determining a group of neighboring base stations based on the first location of the UAV utilizing a machine learning software application, identifying a carrier frequency associated with each of the group of neighboring base stations resulting in a group of carrier frequencies, and providing first instructions over a mobile network to the UAV. The first instructions indicate the group of carrier frequencies. Other embodiments are described in the subject disclosure.

One or more aspects of the subject disclosure include a device, comprising a processing system including a processor, and a memory that stores executable instructions that, when executed by the processing system, facilitate performance of operations. The operations can comprise identifying a first location of an unmanned aerial vehicle (UAV), determining a group of neighboring base stations based on the first location of the UAV utilizing a machine learning software application, identifying a carrier frequency associated with each of the group of neighboring base stations resulting in a group of carrier frequencies, and providing first instructions over a mobile network to the UAV. The first instructions indicate the group of carrier frequencies.

One or more aspects of the subject disclosure include a non-transitory machine-readable medium, comprising executable instructions that, when executed by a processing system including a processor, facilitate performance of operations. The operations can comprise receiving a first group of likelihood parameters from an unmanned aerial vehicle (UAV), and determining a latency parameter associated with the UAV decoding a system information message of each neighboring cell of the group of neighboring cells. Further operations can comprise determining a scanning timer parameter based on the latency parameter, determining a measurement gap length duration associated the UAV based on the scanning timer parameter, and providing first instructions to the UAV, the first instructions indicate the measurement gap length duration. The UAV configures the measurement gap length duration in response to receiving the first instructions.

One or more aspects of the subject disclosure include a method. The method can comprise receiving, by a processing system including a processor, a first group of likelihood parameters from an unmanned aerial vehicle (UAV), and adjusting, by the processing system, a latency parameter associated with the UAV decoding a system information message of each neighboring cell of the group of neighboring cells. Further, the method can comprise determining, by the processing system, a scanning timer parameter based on the adjusted latency parameter, determining, by the processing system, a measurement gap length duration associated the UAV based on the scanning timer parameter, and providing, by the processing system, first instructions to the UAV, the first instructions indicate the measurement gap length duration. The UAV configures the measurement gap length duration in response to receiving the first instructions.

Referring now to FIG. 1, a block diagram is shown illustrating an example, non-limiting embodiment of a system 100 in accordance with various aspects described herein. For example, system 100 can facilitate in whole or in part determining a measurement gap length duration based on the likelihood in detecting neighboring base stations. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
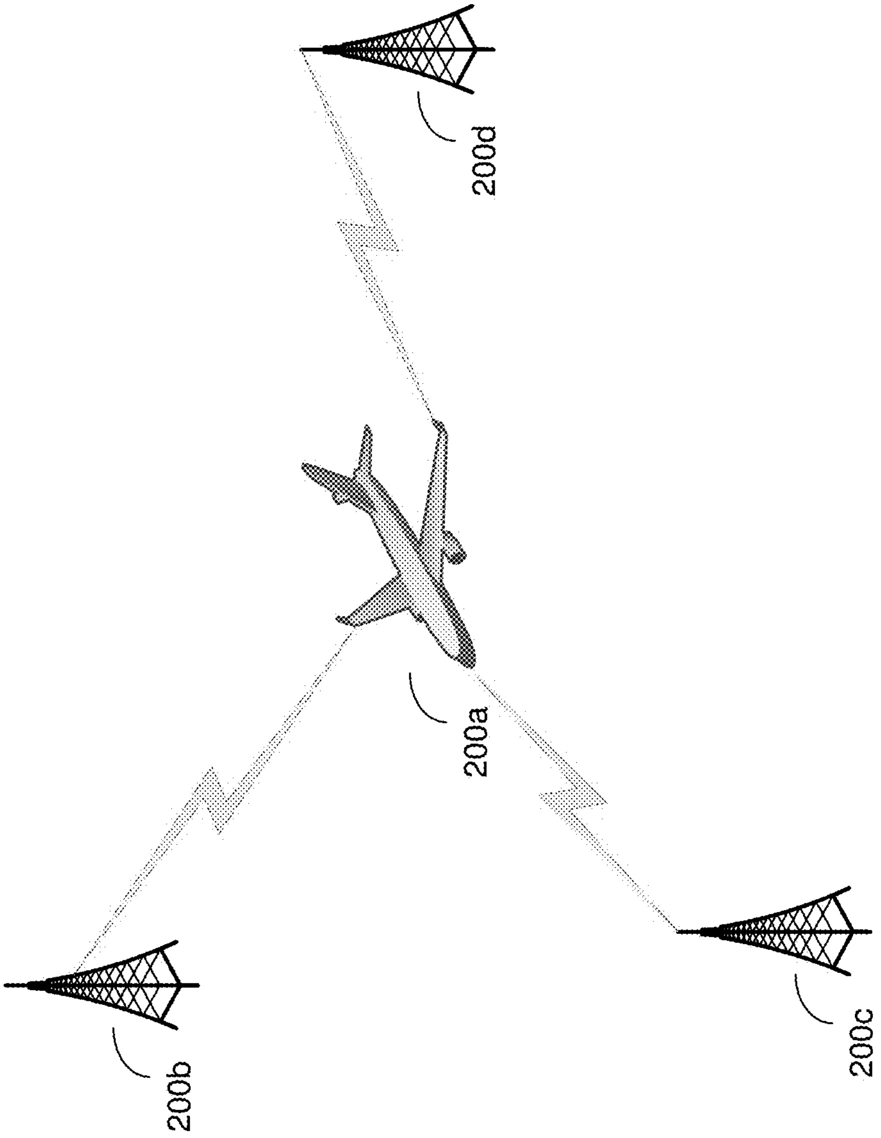
FIGS. 2A-2C are block diagrams illustrating an example, non-limiting embodiments of a system functioning within the communication network of FIG. 1 in accordance with various aspects described herein.
Figure 2B:
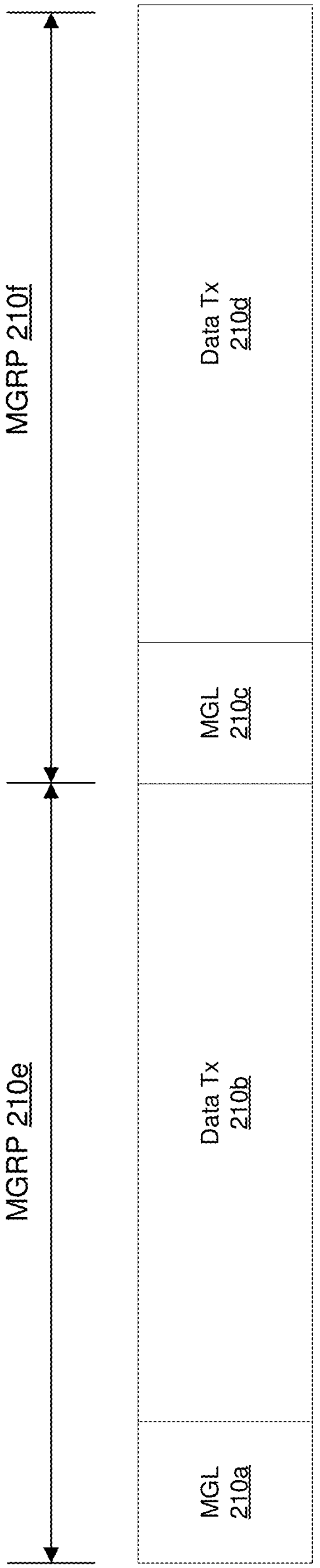
Figure 2C:
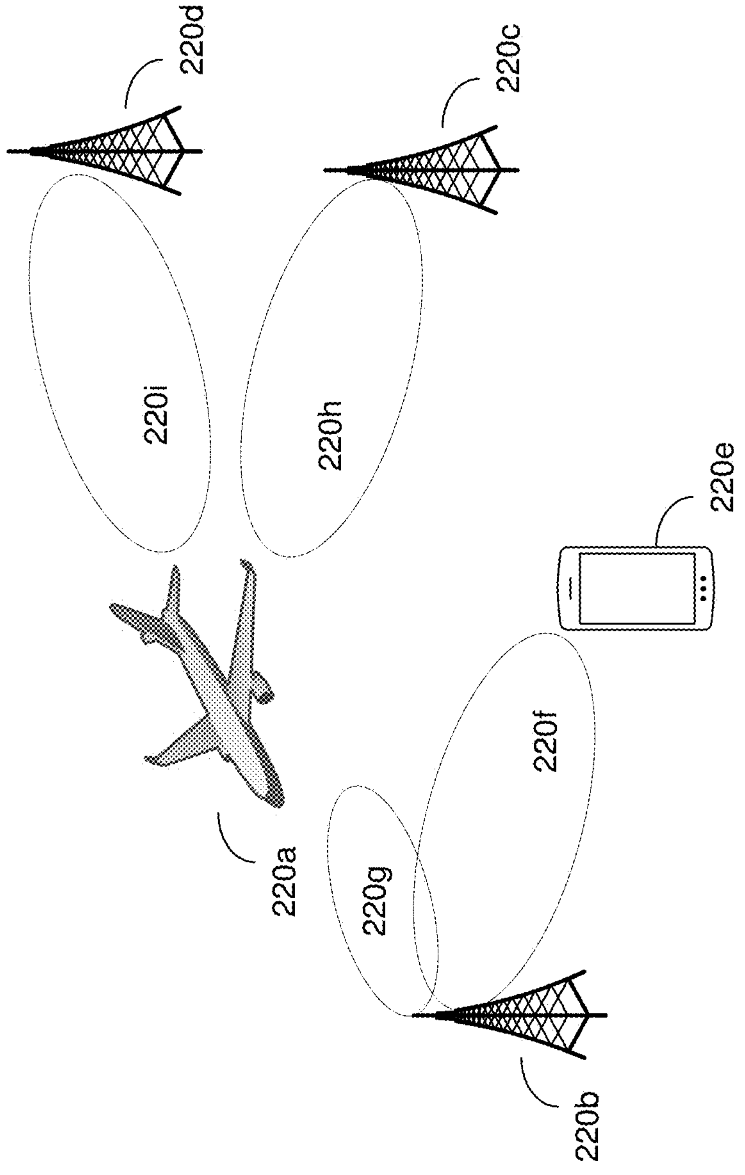

FIGS. 2A-2C are block diagrams illustrating an example, non-limiting embodiments of a system functioning within the communication network of FIG. 1 in accordance with various aspects described herein. Referring to FIG. 2A, in one or more embodiments, system 200 can comprise a UAV 200*a*, base station 200*b*, base station 200*c*, and base station 200*d*, which can comprise a portion of a mobile network. The mobile network can utilize location based services (LBS) to determine a location of UAV 200*a*.

In one or more embodiments, LBS are becoming popular and significant feature for UEs in mobile networks. LBS can include an information service, accessible by a mobile device (e.g., UAV 200*a*) through the mobile network with the ability of mapping the geographic location of the UAV 200*a* at any given time.

In one or more embodiments, Advanced Forward Link Trilateration (AFLT) is an LBS technique used by mobile network operators. AFTL does not use GPS satellites to determine geographic location of the UAV 200*a*. Instead, when AFTL is used, the UAV 200*a* can take measurements of the pilot signals from each of base station 200*b*, base station 200*c*, and base station 200*d* and estimates path losses (based on advertised signal power vs. measured signal power). UAV 200*a* then reports back to a position determination entity (PDE) in the mobile network the estimated path loss of each detected base station together with a corresponding cell-ID associated with each base station. The PDE then can estimate distance from the UAV 200*a* to each of base station 200*b*, base station 200*c*, and base station 200*d*. The PDE can have geographic location in latitude and longitude position of each base station 200*b*, base station 200*c*, and base station 200*d* in the mobile network to triangulate the geographic location of UAV 200*a*.

In one or more embodiments, generally, at least three neighboring base stations may be needed to obtain an accurate geographic location of a UE. AFLT requires precise timing, system-wide (e.g., mobile network-wide) base station synchronization, and reserved channel resources to transmit location data. Indoors, such as in a tunnel or deep inside a building, GPS ranging measurements are not reliably available to determine a geographic location of a UE. However, AFLT offers an alternative for these situations, in which the mobile network and the UE rely solely on ranging to neighboring base stations of the UE.

In one or more embodiments, each of base station 200*b*, base station 200*c*, and base station 200*d* can broadcast periodically cell information in their respective Signal Broadcast Information messages (e.g., system information messages). These signals are broadcasted in an asynchronous mode, to avoid weak signals (e.g., coming from a base station far away from UAV 200*a*), been swamped by signals coming from a nearby base station.

In one or more embodiments, UAV 200*a* can constantly scan and identify each pilot signal (e.g., with a carrier frequency) that can be received from each neighboring base station 200*b*, base station 200*c*, and base station 200*d*, including its serving base station (e.g., base station 200*b*). This pilot signal information can then be sent to PDE by UAV 200*a* periodically. (In some embodiments, the PDE can be part of a serving base station or part of a network device). Further, location accuracy of UAV 200*a* can be impacted in situations in which UAV 200*a* is traveling at high speed and/or passing through a low coverage area. In addition, UAV 200*a* can send out-of-date pilot signal measurements (related to previous UAV 200*a* geographic location) to the PDE. Thus, accurate determination of the geographic location of the UAV 200*a* via triangulation cannot be guaranteed. Also, UAV 200*a* may not be able to receive enough pilot signals during the scanning period, thus data sent to PDE may not be enough identify UAV 200*a* geographic location.

Referring to FIG. 2B, in one or more embodiments, system 210 illustrates data transmission and reception during different time slots for a UAV. One time slot can be a measurement gap length (MGL) 210*a* in which the UAV can receive one or more pilot signals (e.g., with a carrier frequency), each pilot signal can be transmitted by a different neighboring base station. Further, another time slot can be a time slot for data transmission/reception 210*b* in which a UAV can communicate data to/from its serving base station. In addition, another time slot can be another MGL 210*c*. Also, another time slot can be a time slot for data transmission/reception 210*d*. In further embodiments, system 210 can comprise one measurement gap repetition rate (MGRP) 210*e* and another MGRP 210*f*.

In one or more embodiments, when a UAV is in a RRC_CONNECTED mode, it can constantly measures signal power of its current frequency and reports it back to the serving base station. If the reported signal power is below a predefined threshold (i.e., UAV traveling out of the base station coverage), the base station can request UAV to perform mobile network inter-frequency/inter-RAT measurements. In further embodiments, the base station can send to the UE a measurement configuration, which includes measurement gap length duration. During the measurement gap lengths, UAV reception and transmission activities with the serving base station are interrupted.

In one or more embodiments, measurement gap patterns contain gaps every N frames (i.e., the gap periodicity is a multiple of 10 ms). For example, MGL 210*a* and MGL 210*c* can each be 6 ms in duration. A single MGL (each MGL 210*a* and MGL 210*c*) can be used to monitor all possible RATs (inter-frequency LTE FDD and TDD, UMTS, 5G, etc.). Two gap patterns (indicated by a 0 and 1 are defined in standards). For example, each of MGL 210*a* and MGL 210*c* can be 6 ms, in duration using two different MGRP values for each of MGRP 210*e* and MGRP 210*f* (e.g., of duration 40 ms or 80 ms).

In one or more embodiments, measurement reports (e.g., receiving of pilot signals) collected during each of MGL 210*a* and MGL 210*v* are then sent to the serving base station. The serving base station can then decide whether or not to initiate inter-frequency or iRAT handover procedure based on the results.

In one or more embodiments, different MGL durations can be used to trade-off between UAV inter-frequency and inter-RAT measurement performance, UAV data throughput and efficient utilization of transmission resources. In general, as the MGL density increases, measurement performance improves at the cost that the UAV is blocked from data transmission and reception.

Referring to FIG. 2C, in one or more embodiments, system 220 can comprise a UAV 220*a* that can be communicatively coupled to base station 220*b* as its serving base station. Further, UAV 220*a* can receive pilot signal information (e.g., with a carrier frequency) from each of base station 220*c* and base station 220*d*. In addition, a terrestrial UE 220*e* (e.g., mobile phone) can be communicatively coupled to base station 220*b* as its serving base station.

In one or more embodiments, many use cases of UAVs require beyond visual line-of-sight (LOS) communications. Mobile networks offer wide area, high speed, and secure wireless connectivity, which can enhance control and safety of UAV operations and enable beyond visual LOS use cases. Existing LTE networks can support initial UAV deployments. LTE evolution and 5G can provide more efficient connectivity for wide-scale UAV deployments. Further, new and exciting applications for UAVS are emerging and can be a potential growth business area for mobile network operators. Use cases for UAVs can include package delivery, communications and media, inspection of critical infrastructure, surveillance, search-and-rescue operations, agriculture, and other applications.

In one or more embodiments, research and development of current mobile broadband communication (i.e., LTE) has been primarily devoted to terrestrial communication. Providing tether-less broadband connectivity for UAVs is an emerging field in mobile networks. In some embodiments base station antennas can target a terrestrial UE 220*e*. That is, in further embodiments, mobile networks for serving UAVs can be challenging because, traditionally, mobile networks are optimized for terrestrial broadband communication to terrestrial UEs. Thus, for example, the antennas of base station 220*b* can be down-tilted to reduce the interference power level to other base stations such as base station 220*c* and base station 220*d*. With down-tilted antenna of base station 220*b*, UAV 220*a* can be served by the sidelobe 220*g* emanating from the antenna of base station 220*a* while terrestrial UE 220*e* can be served by the main lobe 220*f* emanating from the antenna of base station 220*b*. In some embodiments, an antenna from base station 220*c* can be up-tilted to emanate a main lobe 220*h* toward UAV 220*a* and an antenna from base station 220*d* can be up-tilted to emanate a main lobe 220*i* toward UAV 220*a*.

In one or more embodiments, due to the presence of possible nulls in the sidelobes, and due to the close-to-free-space propagation in the sky, UAV 220*a* can detect several base stations such as base station 220*b*, base station 220*c*, and base station 220*d* in an area. In addition, UAV 220*a* can receive a stronger pilot signal (e.g., with a carrier frequency) from a faraway base station (e.g., base station 220*c*) than the one that is geographically closer (e.g., base station 220*b*). Hence, in some embodiments UAV 220*a* may be served by a faraway base station instead of a closer one.

One or more embodiments include implementing a process for a UAV 220*a* to scan for neighboring base stations (e.g., base station 220*c* and base station 220*d*) during an MGL to assist in triangulating the geographic location of UAV 220*a* or to determine whether to initiate a handover from a serving base station 220*b* to one of the neighboring base stations (e.g., base station 220*c* or base station 220*d*). Further, the process can include utilizing one or more machine learning and prediction techniques to create a list of likely candidate handover neighboring base stations for a given UAV 220*a* based on its current and forecasted geographic location (UAV geographic location can be indicated by latitude/longitude/altitude).

In one or more embodiments, a first group of steps of the process can comprise serving base station 220*b* to include carrier frequency and technology (e.g., LET, 5G, etc.) of the neighboring base stations (e.g., base station 220*c* and base station 220*d*) that are nearby (i.e., 5 miles radius) with a measurement configuration. UAV 220*a* can then report the pilot signal strength detected at each carrier frequency of each neighboring base station during an MGL. Then the process can include serving base station 220*b* providing the carrier frequency and technology (e.g., LTE, 5G, etc.) of the neighboring base stations that are in the next radius ring (i.e., from 5-10 miles). The process can continue until UAV 220*a* is not able to detect any more neighboring base stations. Further, the process can correlate the likelihood and latency associated to detecting a neighboring base station to a given geographic location of UAV 220*a*. Example; UAV @{lat1.long.1.altitude.1} detects: base station2 (e.g., base station 220*c*) with $\emptyset_2$, base station3 (e.g., base station 220*d*) with $\emptyset_3$. Where, $\emptyset_i$ is a likelihood parameter that denotes the likelihood associated of detecting neighboring cell.i. $\emptyset_i$={0-1}, $\emptyset_i$→small means it is unlikely to detect base station.i at the give UAV geographic location, and the latency associated with the detection of this cell is high (e.g., latency associated base station is inversely proportional to the likelihood parameter).

One or more embodiment of the process can comprise a second group of steps that include the serving base station 220*b* to send a list of neighboring base stations to UAV 220*a* with high $\emptyset_i$ based on the current and forecasted geographic location of UAV 220*a* generated using one more machine learning techniques. This list should include at least 2 base stations. The process can also estimate the average time that UAV may spend scanning and detecting these neighboring base station and can indicated by a scanning timer parameter. In addition, the process can include the serving base station 220*b* to configure the MGL for UAV 220*a* according to the scanning timer parameter. The shorter the list and the smaller the MGL, the better the efficiency in data transmission. That is, the UAV 220*a* can spend short period of time in scanning neighboring base station during a relatively short MGL and return to its own data transmission and reception.

One or more embodiments of the process can include updating the list of neighboring base stations periodically and sending it to UAV 220*a*. Note, that the list of neighboring base stations was initially obtained during the first group of steps of the process, but can also be tuned (e.g., revised) even further based on new measurements associated with the neighboring base stations taken during the MGL.

Figure 2D:
FIG. 2D depicts an illustrative embodiment of a method in accordance with various aspects described herein.

FIG. 2D depicts an illustrative embodiment of a method 230 in accordance with various aspects described herein. Aspects of method can be implemented by a base station/network device and/or a UAV. The method 230 can include the base station, at 230*a*, identifying a first location of a UAV. In additional embodiments, the first location of the UAV can be determined using one or more LBS techniques including, but not limited to, triangulation. Further, the method 230 can include the base station, at 230*b*, determining a group of neighboring base stations based on the first location of the UAV utilizing a machine learning software application. In some embodiments, the machine learning software application can utilize one or more machine learning models. In other embodiments, the one or more machine learning models can be selected based on at least one of processor capacity of the base station or memory capacity of the memory associated with the base station. In addition, the method 230 can include the base station, at 230*c*, identifying a carrier frequency associated with each of the group of neighboring base stations resulting in a group of carrier frequencies. Also, the method 230 can include the base station, at 230*d*, providing first instructions over a mobile network to the UAV. The first instructions indicate the group of carrier frequencies.

In one or more embodiments, the method 230 can include the UAV, at 230*e*, determining a likelihood in detecting each carrier frequency of the group of frequencies. Each carrier frequency is associated with each group of base stations. Further, the method 230 can include the UAV, at 230*ee*, determining a likelihood parameter associated with each of the group of base stations resulting in a first group of likelihood parameters. In addition, the method 230 can include the UAV, at 230*f*, providing the first group of likelihood parameters to the base station. Also, the method 230 can include the base station, at 230*g*, identifying a first portion of the first group of likelihood parameters. Further, the method 230 can include the base station, at 230*i*, determining a latency parameter based on the first portion of the first group of likelihood parameters. The method 230 can include the base station, at 230*h*, determining each of the first portion of the first group of likelihood parameters is above a first likelihood threshold. In some embodiments, the identifying of the first portion of the first group of likelihood parameters comprises determining each of the first portion of the first group of likelihood parameters is above a first likelihood threshold.

In one or more embodiments, the method 230 can include the base station, at 230*j*, determining a scanning timer parameter based on the latency parameter. Further, the method 230 can include the base station, at 230*k*, determining a measurement gap length duration associated with the UAV based on the scanning timer parameter. In addition, the method 230 can include the base station, at 230*l*, providing second instructions to the UAV. The second instructions indicate the measurement gap length duration. Also, the method 230 can include the UAV, at 230*m*, implementing the measurement gap length between data transmission based on the measurement gap length duration in response to receiving the second instructions.

In one or more embodiments, the method 230 can include the UAV, at 230*n*, determining a likelihood in detecting a carrier frequency of the group of carrier frequencies. Each carrier frequency is associated with each of the portion of the group of base stations. Further, the method 230 can include the UAV, at 230*o*, determining a likelihood parameter associated with each of a portion of the group of base stations during the measurement gap length resulting in a second group of likelihood parameters. In some embodiments, the UAV determines a likelihood parameter associated with each of a portion of the group of base stations during the measurement gap length resulting in a second group of likelihood parameters in response to determining a likelihood in detecting a carrier frequency associated with each of the portion of the group of base stations.

In one or more embodiments, the method 230 can include the base station 230*p*, receiving the second group of likelihood parameters from the UAV. Further, the method 230 can include the base station 230*q*, identifying a second portion of the second group of likelihood parameters. In addition, the method 230 can include the base station 230*s*, adjusting the latency parameter based on the second portion of the second group of likelihood parameters. Also, the method 230 can include the base station, at 230*r*, determining each of the second portion of the second group of likelihood parameters is above a second likelihood threshold. In some embodiments, the identifying of the second portion of the second group of likelihood parameters comprises determining each of the second portion of the second group of likelihood parameters is above a second likelihood threshold.

In one or more embodiments, the term measurement gap length and measurement gap can refer to the measurement gap (e.g., time slot) between data transmission/reception time slots associated with a UAV.

In one or more embodiments, a base station or network device identifying the first group of likelihood parameters, and determining a latency parameter associated with the UAV decoding the system information message of each neighboring cell of the group of neighboring cells. In further embodiments, the UAV transmits the decoded system information message associated with each neighboring cell of the group of neighboring cells to a network node/device. In addition, the network node/device utilizes the system information message associated with each neighboring cell of the group of neighboring cells to triangulate a second location of the UAV.

In one or more embodiments, the base station and/or the UAV can configure a measurement gap length duration associated with the UAV based on the scanning timer parameter. In additional embodiments, the base station or network device can triangulate a third location of the UAV based on the decoded system information message associated with each neighboring cell of the group of neighboring cells, wherein each decoded system information message was transmitted during the measurement gap length. In some embodiments, the network device can comprise a base station.

In one or more embodiments, the UAV determines a likelihood parameter associated with each of a portion of the group of base stations during the measurement gap length resulting in a second group of likelihood parameters associated to a second group of neighboring cells in response to the UAV decoding a system information message from each of the second group of neighboring cells.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

Portions of some embodiments can be combined with portions of other embodiments.

Figure 3:
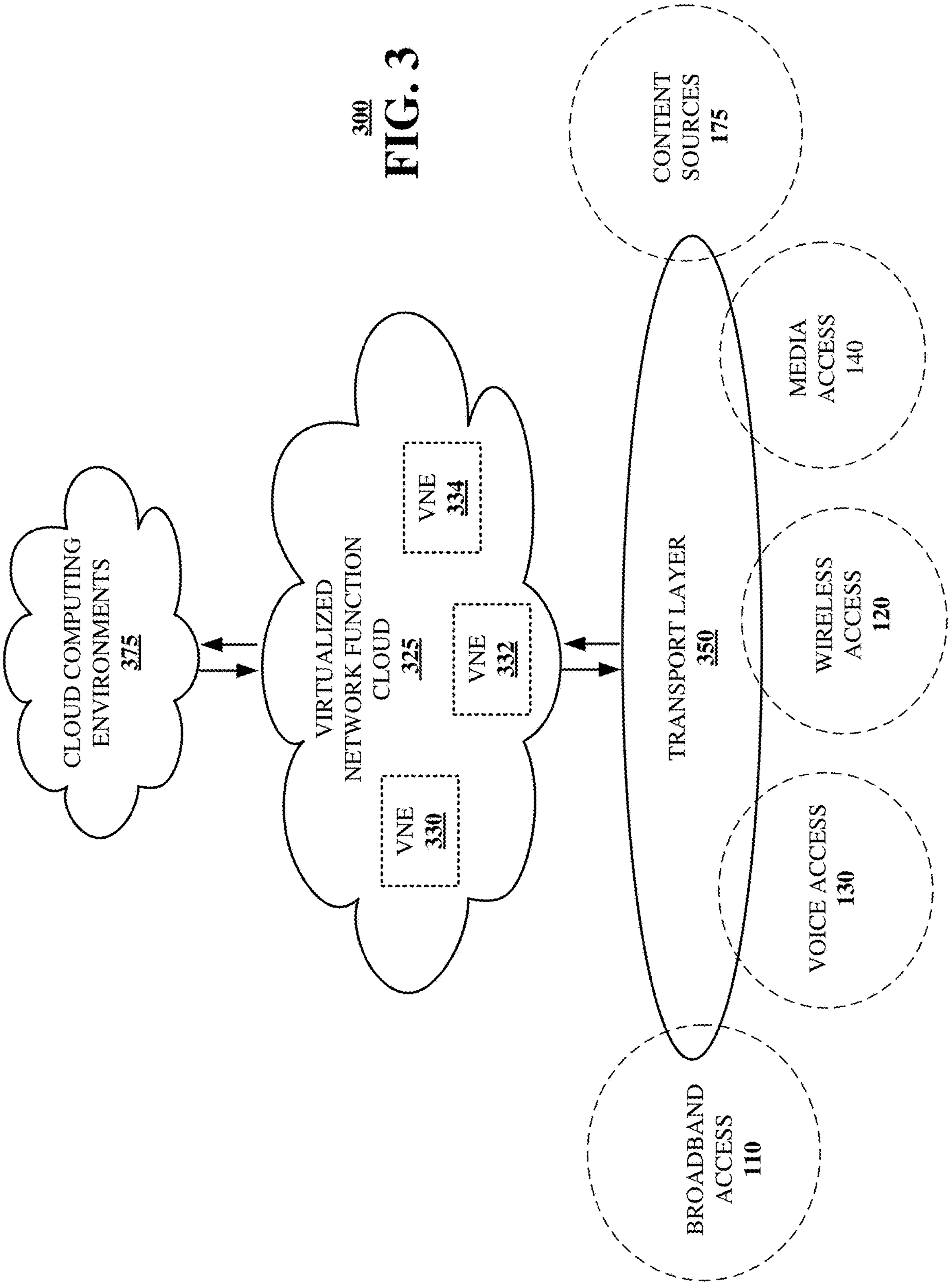
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, system 210, system 220 and method 230 presented in FIGS. 1, 2A, 2B, 2C, 2D and 3. For example, virtualized communication network 300 can facilitate in whole or in part determining a measurement gap length duration based on the likelihood in detecting neighboring base stations.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
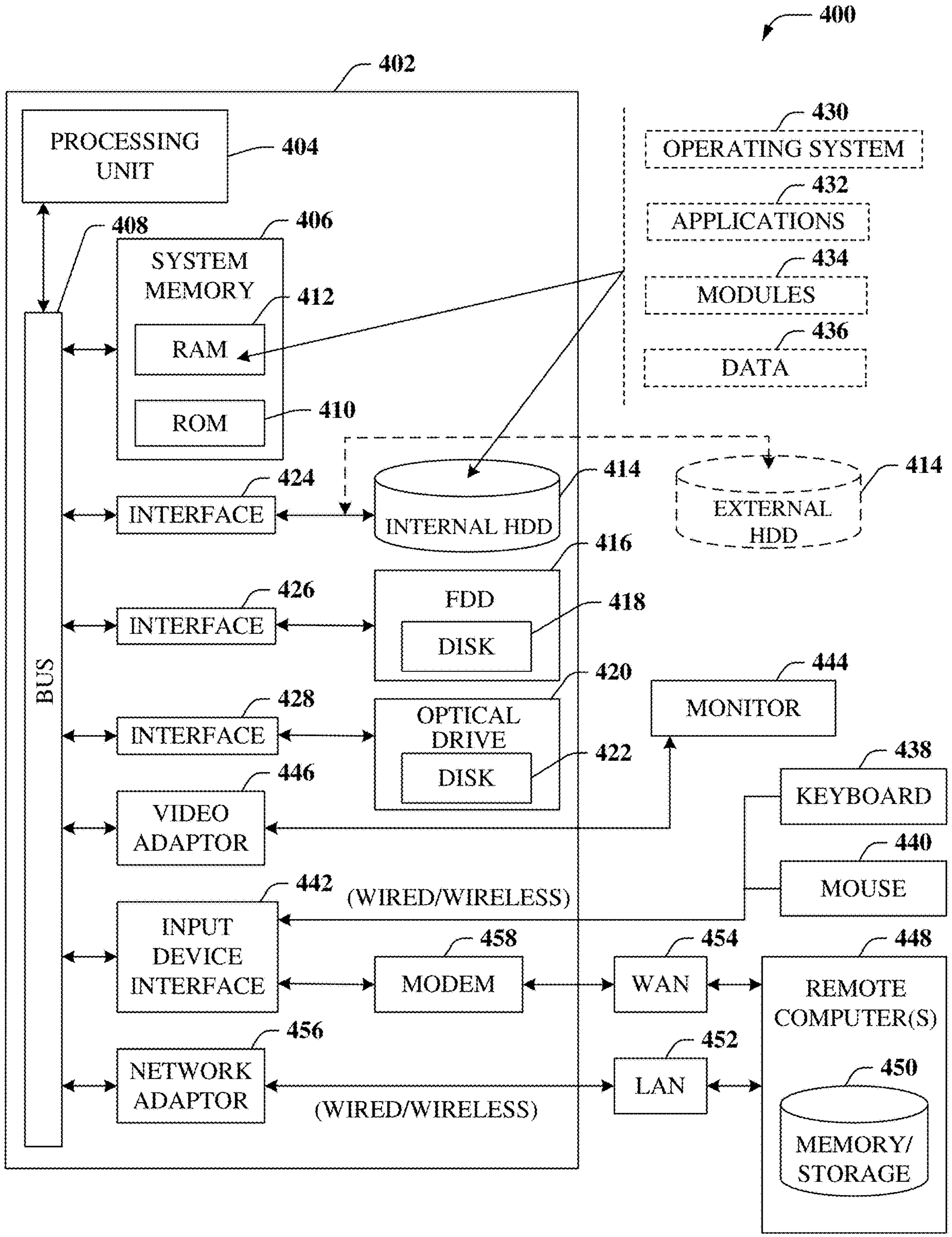
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a measurement gap length duration based on the likelihood in detecting neighboring base stations. Each of UAV 200*a*, base station 200*b*, base station 200*c*, base station 200*d*, UAV 220*a*, base station 220*b*, base station 220*d*, and base station 220*d* can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
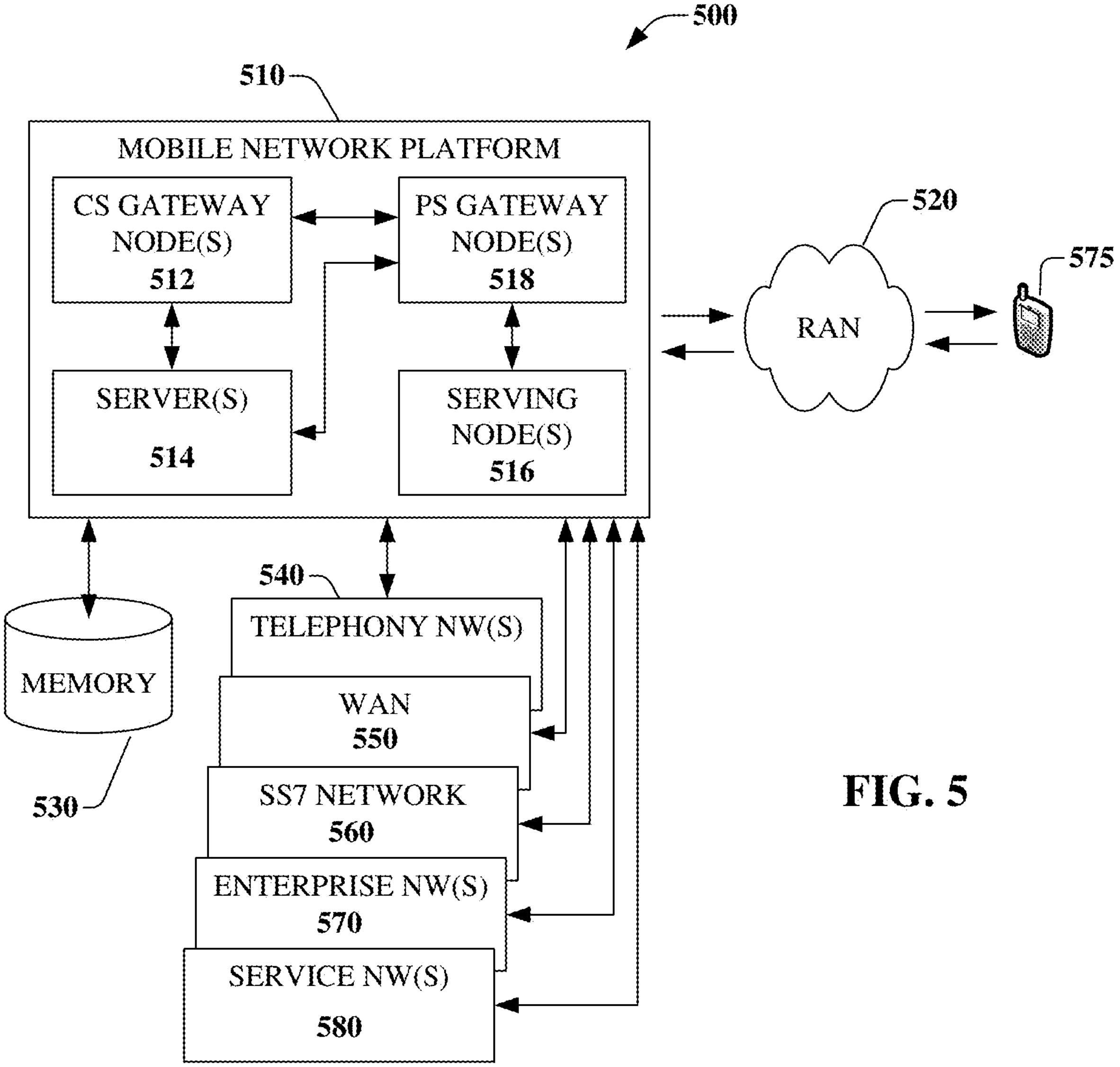
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a measurement gap length duration based on the likelihood in detecting neighboring base stations. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
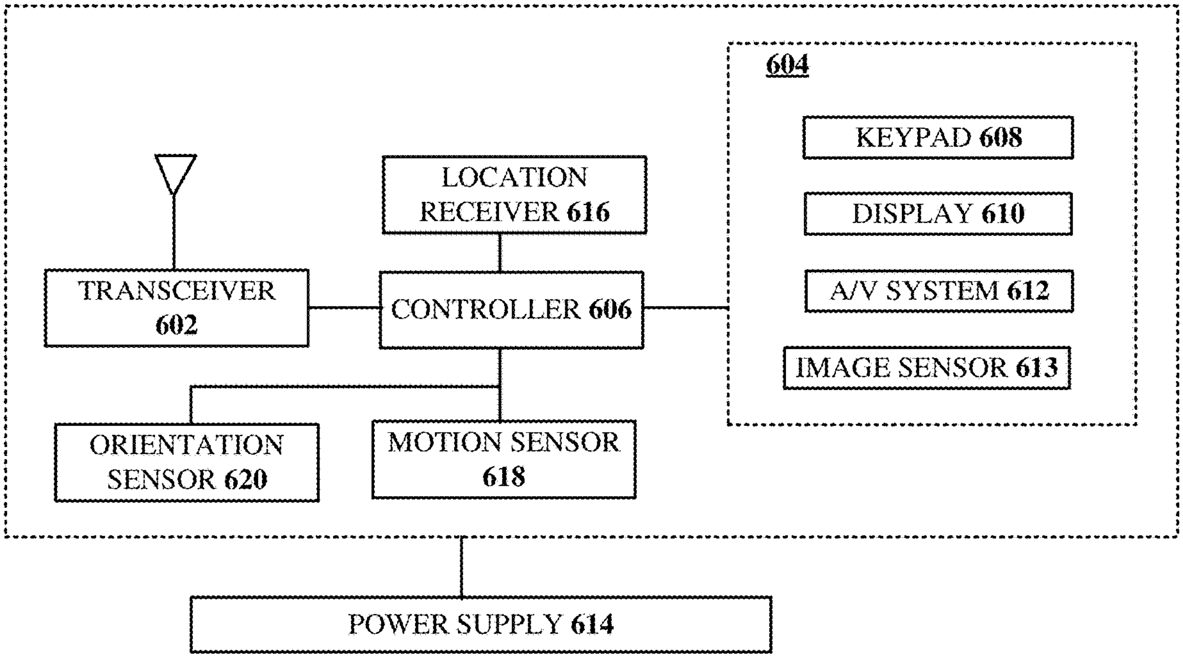
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part determining a measurement gap length duration based on the likelihood in detecting neighboring base stations. Each of UAV 200*a*, base station 200*b*, base station 200*c*, base station 200*d*, UAV 220*a*, base station 220*b*, base station 220*d*, and base station 220*d* can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

receiving a first group of likelihood parameters from an unmanned aerial vehicle (UAV);

determining a latency parameter associated with the UAV by decoding a system information message of each neighboring cell of a group of neighboring cells;

determining a scanning timer parameter based on the latency parameter;

determining a measurement gap length duration associated the UAV based on the scanning timer parameter; and providing first instructions to the UAV, wherein the first instructions indicate the measurement gap length duration, wherein the UAV configures the measurement gap length duration in response to receiving the first instructions.

2. The non-transitory machine-readable medium of claim 1, wherein the decoding of the system information message results in a decoded system information message, wherein the UAV transmits the decoded system information message associated with each neighboring cell of the group of neighboring cells to a network node, wherein the network node utilizes the decoded system information message associated with each neighboring cell of the group of neighboring cells to triangulate a second location of the UAV.

3. The non-transitory machine-readable medium of claim 2, wherein the operations comprise triangulating a third location of the UAV based on the decoded system information message associated with each neighboring cell of the group of neighboring cells, wherein each decoded system information message was transmitted during the measurement gap length.

4. A method, comprising:

receiving, by a processing system including a processor, a first group of likelihood parameters from an unmanned aerial vehicle (UAV);

adjusting, by the processing system, a latency parameter associated with the UAV by decoding a system information message of each neighboring cell of a group of neighboring cells resulting in an adjusted latency parameter, wherein decoding a system information message results in a decoded system information message;

determining, by the processing system, a scanning timer parameter based on the adjusted latency parameter;

determining, by the processing system, a measurement gap length duration associated the UAV based on the scanning timer parameter; and providing, by the processing system, first instructions to the UAV, wherein the first instructions indicate the measurement gap length duration, wherein the UAV configures the measurement gap length duration in response to receiving the first instructions.

5. The method of claim 4, wherein the UAV transmits the decoded system information message associated with each neighboring cell of the group of neighboring cells to a network node, wherein the network node utilizes the system information message associated with each neighboring cell of the group of neighboring cells to triangulate a second location of the UAV.

6. The method of claim 4, comprising triangulating, by the processing system, a third location of the UAV based on the decoded system information message associated with each neighboring cell of the group of neighboring cells, wherein each decoded system information message was transmitted during the measurement gap length.

7. A device, comprising:

a processing system including a processor; and a memory that stores executable instructions that, when executed by the processing system, facilitate performance of operations, the operations comprising:

determining a first scanning timer parameter associated with an unmanned aerial vehicle (UAV);

determining a first measurement gap length duration associated the UAV based on the first scanning timer parameter; and providing first instructions to the UAV, wherein the first instructions indicate the first measurement gap length duration, wherein the UAV configures the first measurement gap length duration in response to receiving the first instructions.

8. The device of claim 7, wherein the operations comprise determining a latency parameter associated with the UAV by decoding a system information message of each neighboring cell of a group of neighboring cells.

9. The device of claim 8, wherein the decoding of the system information message results in a decoded system information message, wherein the UAV transmits the decoded system information message to a network node, wherein the network node utilizes decoded system information message to triangulate a second location of the UAV.

10. The device of claim 9, wherein the operations comprise triangulating a third location of the UAV based on the decoded system information message associated with each neighboring cell of the group of neighboring cells, wherein each decoded system information message was transmitted during the measurement gap length.

11. The device of claim 7, wherein the operations comprise configuring a first measurement gap length duration associated with the UAV based on the first scanning timer parameter.

12. The device of claim 7, wherein the UAV implements a measurement gap length between data transmission based on the first measurement gap length duration.

13. The device of claim 7, wherein the operations comprise:

receiving a group of parameters associated with a group of neighboring cells; and adjusting a latency parameter based on the group of parameters resulting in an adjusted latency parameter.

14. The device of claim 13, wherein the operations comprise determining a second scanning timer parameter based on the adjusted latency parameter.

15. The device of claim 14, wherein the operations comprise determining a second measurement gap length duration based on the second scanning timer parameter.

16. The device of claim 15, wherein the operations comprise providing second instructions to the UAV, wherein the second instructions indicate the second measurement gap length duration.

17. The device of claim 16, wherein the UAV configures the second measurement gap length duration in response to receiving the second instructions.

18. The device of claim 13, wherein the group of parameters comprises a geographic location of the UAV.

19. The device of claim 18, wherein the operations comprise determining a likelihood parameter based on the geographic location of the UAV.

20. The device of claim 19, wherein the adjusted latency parameter is inversely proportional to the likelihood parameter.

* * * * *